(12) United States Patent
Fredrickson et al.

(10) Patent No.: US 7,302,510 B2
(45) Date of Patent: Nov. 27, 2007

(54) FAIR HIERARCHICAL ARBITER

(75) Inventors: Mark S. Fredrickson, Rochester, MN (US); David John Krolak, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 183 days.

(21) Appl. No.: 11/239,615

(22) Filed: Sep. 29, 2005

(65) Prior Publication Data

US 2007/0073949 A1   Mar. 29, 2007

(51) Int. Cl.
*G06F 13/14* (2006.01)

(52) U.S. Cl. ............ 710/243; 710/111; 710/120; 370/447

(58) Field of Classification Search .......... 710/40, 710/116, 240, 244, 309; 370/418, 474
See application file for complete search history.

(56) References Cited

U.S. PATENT DOCUMENTS

| | | | |
|---|---|---|---|
| 5,710,549 A * | 1/1998 | Horst et al. | 710/40 |
| 6,487,213 B1 * | 11/2002 | Chao | 370/418 |
| 6,990,541 B2 * | 1/2006 | Clayton | 710/244 |
| 7,024,506 B1 * | 4/2006 | Harrington | 710/243 |
| 7,051,135 B2 * | 5/2006 | Zhu | 710/116 |
| 2004/0190554 A1 * | 9/2004 | Galloway | 370/474 |
| 2006/0095634 A1 * | 5/2006 | Meyer | 710/309 |
| 2007/0011382 A1 * | 1/2007 | Roever | 710/240 |

* cited by examiner

*Primary Examiner*—Christopher E. Lee
(74) *Attorney, Agent, or Firm*—Robert R. Williams

(57) ABSTRACT

A fair hierarchical arbiter comprises a number of arbitration mechanisms, each arbitration mechanism forwarding winning requests from requestors in round robin order by requestor. In addition to the winning requests, each arbitration mechanism forwards valid request bits, the valid request bits providing information about which requestor originated a current winning request, and, in some embodiments, about how many separate requesters are arbitrated by that particular arbitration mechanism. The fair hierarchical arbiter outputs requests from the total set of separate requestors in a round robin order.

20 Claims, 12 Drawing Sheets

(PRIOR ART) SINGLE CENTRAL ARBITER

(PRIOR ART) UNFAIR HIERARCHICAL ARBITER

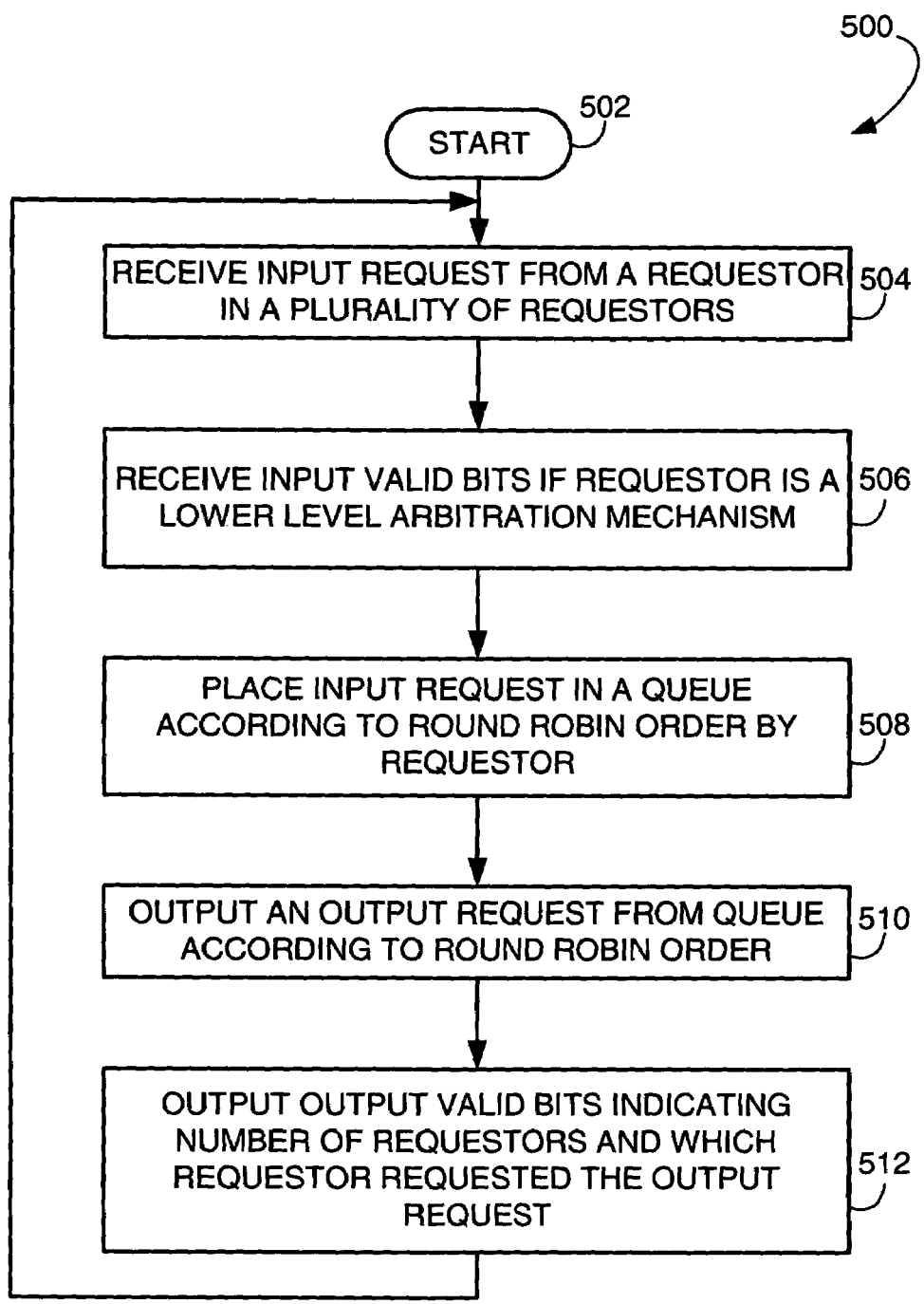

FAIR HIERARCHICAL ARBITER

BACKGROUND OF THE INVENTION

1. Field of the Invention

This invention relates generally to arbitration of competing requests between a plurality of requesters in electronic systems, especially computer systems, and more specifically to hierarchical arbitration mechanisms required to arbitrate competing requests.

2. Description of the Related Art

In a complex computer system multiple processing units may share certain hardware resources, such as a data bus. Arbitration logic is used to arbitrate between competing requests from a number of separate requesters in the shared hardware resource. Arbitration logic can be implemented in a single central arbiter, or it can be implemented in a hierarchical or distributed arbiter. There are problems with each of these types of methods of arbitration.

A central arbiter 100 is shown in prior art FIG. 1, having requestors J0-J4, referenced as 102A-102E, respectively. Requestors J0-J4 is coupled to selection logic 112 by busses 104A-104E, respectively. Central arbiter 100 outputs a winning request on a signaling bus 114. One common problem with a central arbiter, such as central arbiter 100, as shown in FIG. 1, occurs when there are large numbers of requestors (only five, J0-J4, are shown, for simplicity in FIG. 1), or when the requestors are spread out physically. Central arbiters, such as central arbiter 100, require complex wiring. For example, requesters J0-J4 drive busses 104A-104E. Each bus 104A-104E typically comprises many wires, e.g., 64 wires. Busses 104A-104E all funnel into selection logic 112; a large number of wide busses (e.g. 64 bit busses) funneling into selection logic 112 causes wiring congestion problems. Because of physical distances busses 104A-104E must travel, additional time may be required for signal propagation, delaying each request. A control logic 110 provides control for selection logic 112 and, for example, may implement a round robin ordering or a first in, first out, ordering selection of requests.

To avoid the wiring congestion and wire length difficulties involved with a central arbiter, a hierarchical arbiter is often used when many requestors need to be arbitrated, especially when the requestors are physically widely separated. Several problems exist with prior art hierarchical arbiters. One common problem with a hierarchical arbiter occurs when requests need to be arbitrated in multiple levels of arbitration mechanisms. If requestors are not equally prolific (a more prolific requestor sends its requests to an arbitration mechanism more frequently than a non prolific requestor) in their requests, then a less prolific requestor may have to wait a considerable time before a request from the less prolific requestor is selected as a winning request. Requests from low level requestors are only infrequently chosen as the final winning request. A lower level requestor's requests must pass through more levels of arbitration in a hierarchical arbiter than a higher level requestor.

FIG. 2 illustrates an exemplary prior art hierarchical arbiter 200 to further explain inherent problems in prior art hierarchical arbiters. Hierarchical arbiter 200 comprises arbitration mechanisms 210A, 210B, 210C, and 210D, generically called arbitration mechanisms 210, with the appended letter used to denote particular instantiations of arbitration mechanism 210. Hereinafter, reference numerated items having an alphabetic character appended are particular instantiations of a generic item.

Arbitration mechanism 210A is a lowest level arbitration mechanism, (i.e. arbitration mechanism furthest away from a final stage of arbitration). Arbitration mechanisms 210B and 210C are higher level mechanisms, (i.e. arbitration mechanisms closer to the final stage of arbitration). Arbitration mechanism 210D is the highest level arbitration mechanism (i.e. the arbitration mechanism wherein the last stage of arbitration mechanism occurs).

Arbitration mechanism 210A arbitrates competing requests originating from requesters L0, L1 and L2. Requestors L0-L2 sends requests to a queue 204A. Requestors L0, L1, L2 each inform control logic 208A when they are driving valid requests, using additional signaling couplings (not shown). Requests from requesters L0-L2 are processed, under control of control logic 208A, within queue 204A on a round robin basis and the winning request is forwarded to higher level arbitration mechanism 210B on bus 214A. In some arbitration mechanisms 210, a FIFO (First In First Out) process is implemented instead of a round robin mechanism. For purposes of explanation, a round robin ordering will be used hereafter for arbitration mechanisms 210.

Arbitration mechanism 210B arbitrates competing requests from requesters L3, L4, and arbitration mechanism 210A. Arbitration mechanism 210A appears as a requester to arbitration mechanism 210B; however arbitration mechanism 210A is a nonprimitive requestor, since arbitration mechanism 210 arbitrates among several requestors. "Requestor" denotes a primitive requester, as opposed to an arbitration mechanism such as arbitration mechanism 210A, which will be referred to as nonprimitive requestors. A primitive requester is referred to as a "separate requestor", or simply a "requestor". Requestors L3 and L4, and arbitration mechanism 210A send requests to a queue 204B. Requests from requesters L3, L4, and arbitration mechanism 210A are processed within queue 204B on a round robin basis under control of a control logic 208B and the winning request is forwarded to arbitration mechanism 210D on a bus 214B. Requests sent on bus 214A are selected only ⅓ of the time (assuming that L3, L4, and arbitration mechanism 210A each always has an active request for arbitration mechanism 210B. If requestors L0, L1, and L2 are all prolific, L0, L1, and L2 each therefore win ⅓ of requests sent on bus 214A, and therefore only ⅓*⅓ or ⅑ of winning requests sent on bus 214B. Arbitration mechanism 210B appears as a nonprimitive requestor to arbitration mechanism 210D.

Arbitration mechanism 210C arbitrates requests originating from four competing requesters L5, L6, L7, and L8. Requestors L5-L8 sends requests to a queue 204C. Requests from requesters L5-L8 are processed, under control from control logic 208C, within queue 204C, on a round robin basis, and the winning request is forwarded to arbitration mechanism 210D on a bus 214C. Arbitration mechanism 210C appears as a nonprimitive requester to arbitration mechanism 210D.

Arbitration mechanism 210D arbitrates requests from four competing requesters: L9, L10, arbitration mechanism 210B, and arbitration mechanism 210C. Requests from requestors L9, L10, arbitration mechanism 210B, and arbitration mechanism 210C are processed, under control by a control logic 208D, within queue 204D on a round robin basis, and the winning request is output on a bus 214D. Bus 214D is further coupled to a request handler (not shown). The request handler can be different in different electronic systems. For example, in a first electronic system, the requests are computer executable instructions, and the request handler executes the winning requests. In another electronic system, the requests are for data movement, and the request handler moves data from a first location to a second location. This winning request is the winning request of the hierarchical arbiter.

The aggregate effect of hierarchical arbiter 200 can be very unfair, in particular, for requestors separated from the highest level arbitration mechanism (that is, the arbitration mechanism driving the winning request out of the hierarchical arbiter) by one or more intermediate level arbitration mechanisms. A hierarchical arbitration mechanism acts fair if, after a long period of time, and, if all requestors are submitting prolific requests, each requester has been chosen the winner of the fair hierarchical arbiter approximately the same number of times.

For example, if all requesters L0-L10 are prolific, each making constant requests, L9 and L10 would each get their request output on signal 214D (i.e., be the winning request) ¼ of the time (since queue 204D would always have active requests on each of its four inputs). Each of requestors L5, L6, L7, and L8 requesters would get a winning request only 1/16 of the time (four requesters each sharing one input to queue 204D, the one input to queue 204D itself is chosen only ¼ of the time). Similarly, each of requestors L3 and L4 would get a winning request 1/12 of the time. And, each of requesters L0, L1, L2 would get a winning request only 1/36 of the time. Since there are 11 requesters (L0-L10), a fair hierarchical arbiter would give each requester a winning request 1/11 of the time.

Therefore, there is a need for a method and apparatus that provides for a fair hierarchical arbiter.

SUMMARY OF THE INVENTION

The present invention provides a hierarchical arbiter that fairly arbitrates between competing requesters. The hierarchical arbiter acts fair if, after a long period of time, and, if all requesters are submitting prolific requests, each requestor has been chosen the winner of the fair hierarchical arbiter approximately the same number of times.

"Approximately" accounts for differences in number of times each requestor's requests are selected as winning requests caused by possible pipelining delays that may occur in pipelined embodiments of the fair hierarchical arbiter as will be described later. In a particular design, there may be other reasons unique to that particular design that requires additional cycles to propagate a request from a particular requestor, further degrading the degree to which the fair hierarchical arbiter chooses each requester approximately the same number of time.

A hierarchical arbiter contains multiple levels of arbitration mechanisms. A low level arbitration mechanism is furthest away from a final stage of arbitration, and a higher level arbitration mechanism is closer to the final stage of arbitration. A highest level arbitration mechanism is the final stage of arbitration and drives a winning request to a request handler.

Each particular arbitration mechanism in the fair hierarchical arbiter is aware of a total number of separate requestors it is arbitrating, including requesters directly connected to the particular arbitration mechanism as well as requests arbitrated at a lower level arbitration mechanism that are forwarded to the particular arbitration mechanism. Each particular arbitration mechanism is made aware of the total number of separate requestors it is arbitrating in a first embodiment by valid request bits being received by the particular arbitration mechanism. In a second embodiment, each particular arbitration mechanism is made aware of the total number of separate requestors it is arbitrating, including requesters directly connected to a lower level arbitration mechanism, by a value in a register, a value burned into a fuse, or by a logical design of the particular arbitration mechanism.

Each particular arbitration mechanism is made aware of valid requests, and which requestor originated the valid requests, input to the particular arbitration mechanism. In an embodiment, valid requests are identified by an unencoded valid request bits value. In an embodiment, the valid request bits are encoded, the encoded value of the valid request bits denoting which requester originated the valid requests.

In a particular arbitration mechanism, there is queue that receives requests. The queue may be a single converged queue, a plurality of queues with one queue per requestor, or a combination or converged queues and separate queues for particular requesters. The requests can be originated from requesters connected directly to the particular arbitration mechanism. The requests can also be originated by requesters connected to a lower level arbitration mechanism, the lower level arbitration mechanism being further coupled to the particular arbitration mechanism. The queue receives requests from the requesters, and chooses a winning request to output under control of control logic. The queue located within each arbitration mechanism stores a series of requests that are waiting to be selected as a winning request driven by that arbitration mechanism. From the queue, the arbitration mechanism chooses the winning request based upon control logic that enforces a round robin order of arbitration. The winning request is then forwarded to either a higher level arbitration mechanism, or to an output bus of the hierarchical arbiter. From a lower level arbitration mechanism, valid request bits, further described below, are forwarded to a higher level arbitration mechanism. The higher level mechanism receives these signals and uses them to fairly arbitrate between requests from a total set of requestors arbitrated in the higher level arbitration mechanism, including requesters at one or more lower levels of arbitration mechanism.

Each arbitration mechanism utilizes logic that is referred to as control logic which enforces a round robin order by requestor for selecting winning requests. In an embodiment of the arbitration mechanism, requests from less prolific requestors are allowed by the control logic to bypass over requests from prolific requesters. To accomplish the bypass, the arbitration mechanism must detect that the queue contains a plurality of requests from a first requestor. When a new request arrives from a second requestor, the new request is allowed to pass some or all of the plurality of requests in the queue, and thereby be the winning requestor of that arbitration mechanism without waiting for all requests in the queue. Round robin arbitration is therefore enforced within the arbitration mechanism. It will be understood that round robin ordering is used for exemplary purposes; however other ordering is also contemplated.

Each arbitration mechanism will utilize a predefined round robin arbitration order to arbitrate between the competing requests. In general, given a total set of separate requestors to arbitrate (e.g., R0, R1, R2 . . . , Rn) the arbitration mechanism will simply select R0, then R1, then R2, and so on, although other orders are contemplated. For example, a designer of the fair hierarchical arbiter may define the round robin arbitration order to be Rn, Rn-1, . . . R2, R1, R0. When the arbitration mechanism processes though the order to the last requester, it will repeat the arbitration in the same order as defined. This processes repeats continuously. A request originating from a particular requester can only be chosen as the winning request when the requester originating the winning request is identified as the requestor to be chosen based on the round robin order. If, at a particular time, the arbiter is due to choose a request from a requestor that has no current request, the arbiter will move to the next available requestor in the round robin order that does have a request.

To effectively pass information from the low level arbitration mechanism to the higher level arbitration mechanism, valid request bits are implemented. Higher level arbitration mechanisms must process valid request bits and the winning request from lower level arbitration mechanisms. The valid request bits specify how many requesters were arbitrated by the lower level arbitration mechanism. The valid request bits also specifies which lower level requestor, if any, is the winning requestor arbitrated in the lower level arbitration mechanism. Having received valid request bits, each higher level arbitration mechanism is aware of how many separate requesters are being arbitrated. For example, if three requestors (e.g., R0, R1, R2) are arbitrated by a lower level arbitration mechanism coupled to a higher level arbitration mechanism that has two requesters (e.g., R3, R4) directly coupled to the higher level arbitration mechanism, the higher level arbitration will process requests in round robin order of the entire set of separate requestors it is arbitrating, that is, in the example, R0, R1, R2, R3, and R4. In alternative embodiments, the round robin order provides at least some alternation between requesters connected to different levels of arbitration mechanism. In the example, a round robin order of R0, R3, R1, R4, and R2 would allow at least some time for transmitting of requests from lower level arbitration mechanisms and corresponding acknowledgements by higher level arbitration mechanisms.

BRIEF DESCRIPTION OF THE DRAWINGS

FIG. 4 is a flow chart illustrating a method embodied in an arbitration mechanism of the fair hierarchical arbiter.

DETAILED DESCRIPTION OF THE PREFERRED EMBODIMENTS

Figure 1:
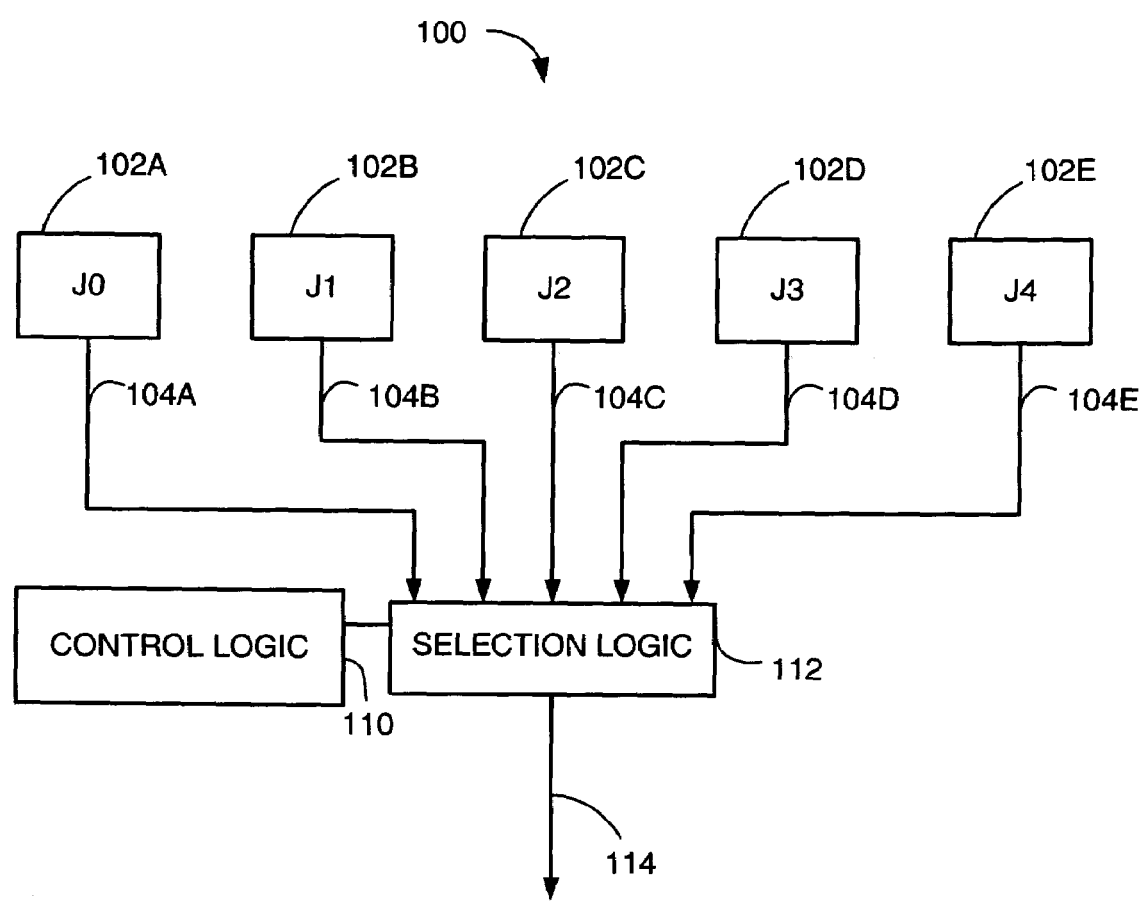
FIG. 1 is a prior art diagram of a single central arbiter.
Figure 2:
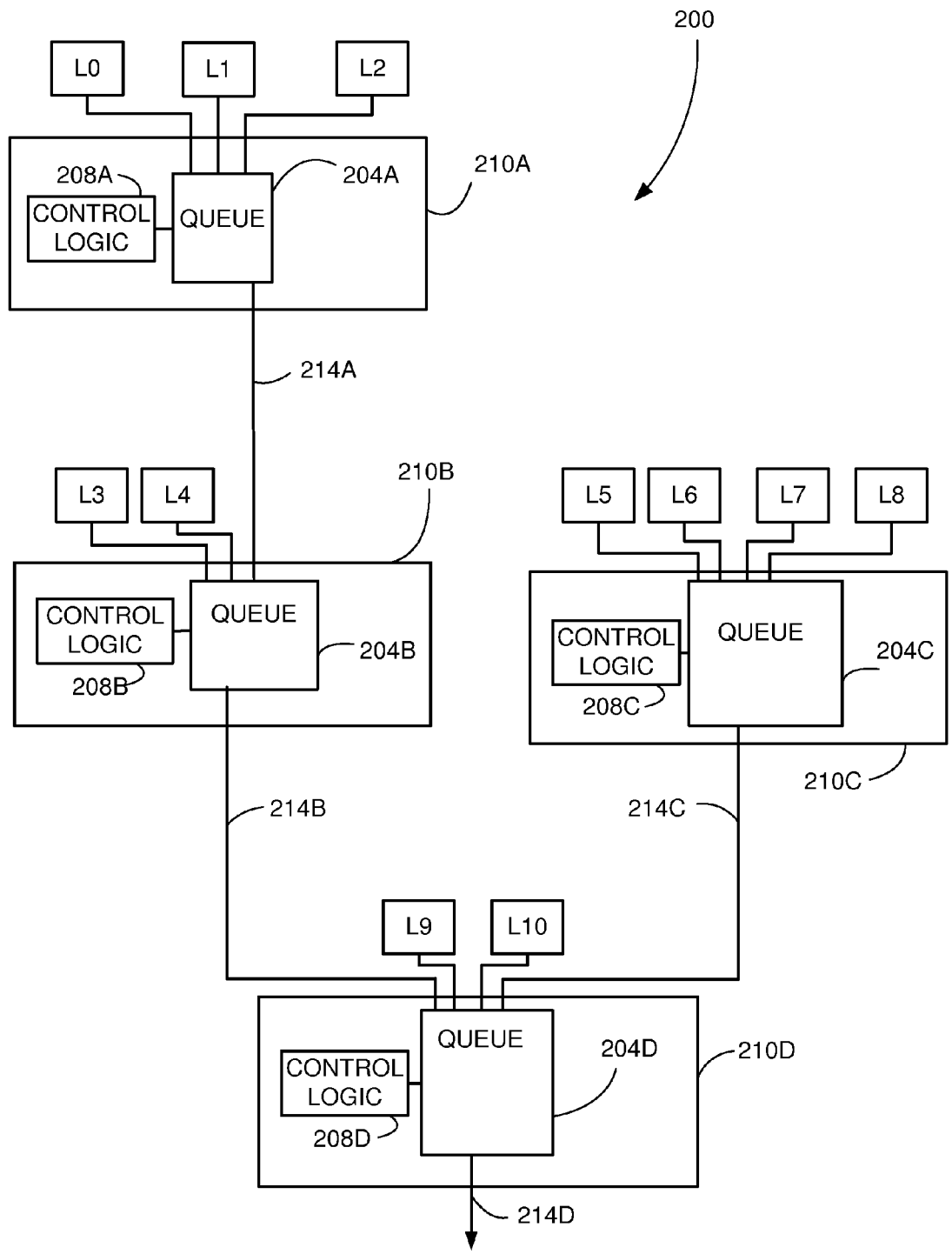
FIG. 2 is a prior art diagram of an unfair hierarchical arbiter.

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

The present invention provides a fair hierarchical arbiter that fairly arbitrates between competing requesters.

The hierarchical arbiter acts fair if, after a long period of time, and, if all requesters are submitting prolific requests, each requester has been chosen the winner of the hierarchical arbitration approximately the same number of times.

"Approximately" as used above accounts for differences in number of times requesters' requests are selected as winning requests caused by pipelining delays of the fair hierarchical arbiter in pipelined embodiments, as will be described later. In a particular design, there may be other reasons unique to that particular design that requires additional cycles to propagate a request from a particular requestor, further degrading the degree to which the fair hierarchical arbiter chooses each requestor approximately the same number of time.

The fair hierarchical arbiter contains a plurality of levels of arbitration mechanisms. Low level arbitration mechanisms are logically furthest away (that is, winning requests from low level arbitration mechanisms must traverse one or more levels of arbitration mechanisms before being the winning request from a final winning request output of the fair hierarchical arbiter, and higher level arbitration mechanisms are closer to the final stage of arbitration. The highest level arbitration mechanism is the final stage of arbitration and drives the winning request of the fair hierarchical arbiter. A particular arbitration mechanism receives requests from any lower level arbitration mechanisms, as well as requests from any requestors connected directly to the particular arbitration mechanism, and outputs a winning request. Lower level arbitration mechanisms forward information to the higher level arbitration mechanism valid request bits that identify which requestor that is arbitrated by the lower level arbitration mechanisms originated a current request driven to the higher level arbitration mechanism.

The arbitration mechanism processes the competing requests by utilizing a queue coupled to control logic. The queue may comprise a single converged queue, a queue for each requester, or a combination of both. The queue stores requests that are waiting to be output as the winning request. From the queue, the arbitration mechanism chooses a winning request based upon control logic enforcing a round robin order of arbitration, both to be described below. The winning request is then forwarded to either a higher level arbitration mechanism, or as a winning request of the fair hierarchical arbiter.

Figure 3A:
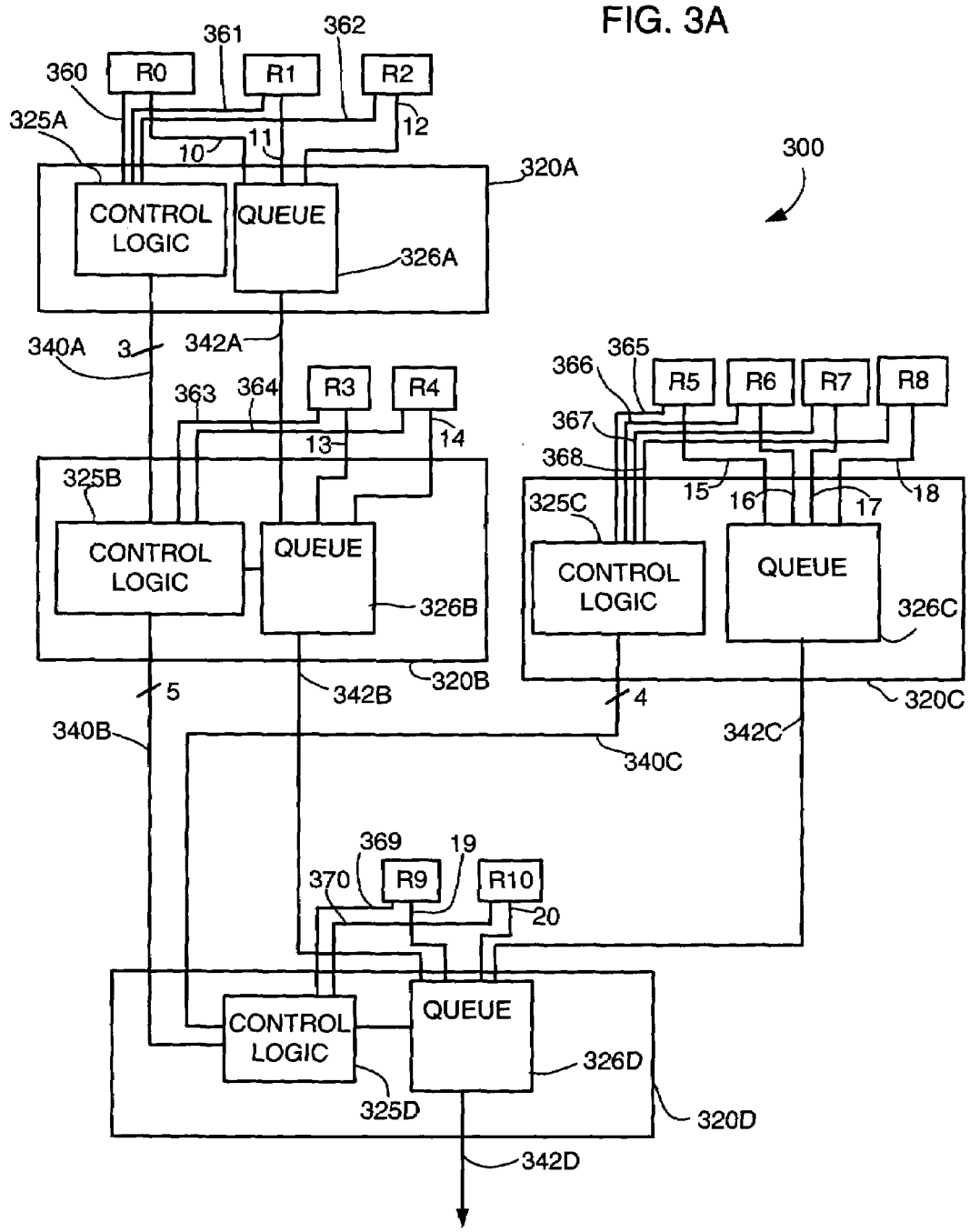
FIG. 3A is a high level diagram of a fair hierarchical arbiter.

Referring now to FIG. 3A, a fair hierarchical arbiter 300 is shown. Fair hierarchical arbiter 300 comprises four instantiations of an arbitration mechanism 320: an arbitration mechanism 320A at a lowest level (i.e., furthest away from the output of fair hierarchical arbiter 300); an arbitration mechanism 320B, which is a higher arbitration level than arbitration mechanism 320A; an arbitration mechanism 320C; and an arbitration mechanism 320D at the highest level of arbitration.

Requestors R0, R1, and R2 pass their requests on busses 10, 11, and 12, respectively, to a queue 326A in arbitration mechanism 320A. Control logic 325A receives valid request bits 360, 361, 362, respectively, from requesters R0, R1, R2. A "1" on valid request bits 360, 361, 362 indicates that a valid request is being driven on corresponding bus 10, 11, and 12. Control logic 325A enforces a round robin ordering of requests from requesters R0, R1, and R2. Within queue 326A, a process of request bypassing may take place so that each requestor will win in a round robin order. In an embodiment, a request from a first requestor can bypass a request from a second requestor and be the winning request from arbitration mechanism 320A before all of a plurality of requests from the second requester is processed. Exiting arbitration mechanism 320A are valid request bits 340A (3 bits, one for each requestor arbitrated), and a winning request, forwarded to arbitration mechanism 320B, described below, on a bus 342A.

Valid request bits 340A carry information that specifies that separate requesters R0, R1, and R2 are arbitrated by arbitration mechanism 320A, and which requester R0, R1, or R2 originated the winning request driven on bus 342A. A bit exists in valid request bits 340A for each separate requestor being arbitrated. A "1" bit in a bit location corresponding to a particular requestor means that the request driven on bus 342A originated from that particular requestor. For example, if a request from R0 is the winning request driven on bus 342A, valid request bits 340A would be "100". If a request from R1 is the winning request driven on bus 342A, valid request bits 340A would be "010". If a request from R2 is the winning request driven on bus 342A, valid request bits 340A would be "001". If there are no outstanding requests from requestors R0, R1, and R2, valid requests 340A would be "000". Valid request bits 340A are forwarded to arbitration mechanism 320B.

Higher level arbitration mechanism 320B must arbitrate requests from directly connected requesters R3, R4, sent on busses 13, 14, respectively, and the winning request forwarded by arbitration mechanism 320A, on bus 342A. Arbitration mechanism 320A therefore acts as a requestor to arbitration mechanism 320B; however arbitration mechanism 320A is not a simple requestor, since requests are from separate requesters (R0, R1, R2), rather than a single requester. Arbitration mechanism 320B therefore arbitrates a total set of separate requesters (R0, R1, R2, R3, and R4) in round robin order.

Arbitration mechanism 320B receives valid request bits 340A that inform a control logic 325B that the requests forwarded by arbitration mechanism 320A can be requests from three separate requestors (R0, R1, R2), and informs control logic 325B which requestor from arbitration mechanism 320A originated the winning request currently on bus 342A. If a winning request is not currently being driven on bus 342A valid request bits 340A inform control logic 325B at there are no active requests being driven on bus 342A. Control logic 325B also receives valid request bits 363, 364, respectively, from requestors R3 and R4. A "1" on valid request bits 363, 364, respectively, indicate that a valid request is driven on busses 13, 14, respectively. Arbitration mechanism 320B contains a queue 326B which stores requests, and control logic 325B, which provides control to enforce a round robin order of arbitration between requests from separate requestors R0, R1, R2, R3, and R4. Arbitration mechanism 320B forwards valid request bits 340B (five bits, one per each separate requestor arbitrated, i.e., R0, R1, R2, R3, and R4), and the winning request, on a bus 342B, to highest level arbitration mechanism 320D. Valid request bits 340B carry information that specifies that requests from five separate requestors (R0, R1, R2, R3, R4) are arbitrated in arbitration mechanism 320B, and which requestor (R0, R1, R2, R3, or R4) originated the request selected as the winning request forwarded on bus 342B. For example, if the winning request from arbitration mechanism 320B originated from requestor R1, valid request bits 340B would be "01000". If the winning request from arbitration mechanism 320B originated from requestor R4, valid request bits 340B would be "00001". If there is not a valid request being driven on bus 342B, valid request bits 340B would be "00000".

Arbitration mechanism 320C must arbitrate four competing requestors R5, R6, R7, and R8, all directly connected to arbitration mechanism 320C. Requestors R5, R6, R7, and R8 transmit their requests to a queue 326C on busses 15, 16, 17, and 18, respectively. A control logic 325C enforces a round robin order of arbitration between requests from requestors R5-R8. Control logic 325C receives valid request bits 365, 366, 367, and 368, sent from requestors R5, R6, R7, and R8, respectively. A "1" on valid request bits 365, 366, 367, and 368 indicate that valid requests are being driven on busses 15, 16, 17, and 18, respectively. Arbitration mechanism 320C outputs valid request bits 340C (four bits, one per each requestor arbitrated), and the winning request to arbitration mechanism 320D, on a bus 342C. Valid request bits 340C carry information that specifies that four requestors (R5, R6, R7, and R8) are arbitrated in arbitration mechanism 320C, and which requestor (R5, R6, R7, or R8) originated the winning arbitrated request forwarded on bus 342C. For example, if requestor R5 originated the winning request driven on bus 342C, valid request bits 340C would be "1000".

Highest level arbitration mechanism 320D must arbitrate requests from directly connected requestors R9, R10, and winning requests forwarded from arbitration mechanism 320B and arbitration mechanism 320C. That is, arbitration mechanism 320D must arbitrate the entire set of eleven separate requestors (R0-R10) in round robin order.

Requests from R9, R10, arbitration mechanism 320B, and arbitration mechanism 320C are coupled to queue 326D. A control logic 325D receives valid request bits 340B from arbitration mechanism 320B that inform control logic 325D that the requests forwarded by arbitration mechanism 320B on bus 342B can be requests from five separate requestors (R0, R1, R2, R3, R4), as well as which requestor (R0, R1, R2, R3, R4) originated a current request on bus 340B, as explained above. If there are no outstanding requests from R0, R1, R2, R3, or R4, all bits in valid request bits 340B are "0" (that is, "00000"). Control logic 325D also receives valid request bits 340C that inform control logic 325D that the requests forwarded by arbitration mechanism 320C can be requests from four separate requestors (R5, R6, R7, and R8). Valid request bits 340C indicate which requestor (R5, R6, R7, and R8) originated a current request on bus 342C. If there are no outstanding requests from R5, R6, R7, and R8, valid request bits 340C are "0000". Control logic 325D also receives valid request bits 369, 370. A "1" on valid request bits 369, 370 indicate that valid requests are being driven on busses 19, 20, respectively. Control logic 325D enforces a round robin order of arbitration over the entire set of requestors arbitrated (R0-R10). Arbitration mechanism 320D drives a winning request of the hierarchical arbiter 300 on bus 342D. The overall winning request for the fair hierarchical arbiter is a request originating from one of requestors R0, R1, R2, R3, R4, R5, R6, R7, R8, R9, or R10, selected in a round robin order by requestor. It will be understood that the round robin order need not be R0, R1, ..., R10. For example, a designer may choose a round robin order of R10, R9, ..., R0.

In particular, in pipelined embodiments to be described later, some delays are expected in transmitting a particular request from a lower level arbitration mechanism to a higher level arbitration mechanism, and awaiting an acknowledgement from the higher level arbitration mechanism. Defining a round robin order that does not consecutively select requests from selectors at a particular lower level arbitration mechanism will partially or totally "hide" such delays. In the example of fair hierarchical arbiter 300 in FIG. 3, a particular round robin ordering of (R0, R5, R3, R9, R6, R1, R4, R7, R2, R10, R8) ensures that a number of cycles separate selections from a particular lower level arbiter, allowing time for transmission of requests from the lower level arbitration mechanism to the higher level arbitration as well as acknowledgements sent back from the higher level arbitration mechanism to the lower level arbitration mechanisms. The particular round robin ordering ensures at least two cycles between selections of requests from requestors R0, R1, R2; at least three cycles between selections of request from requestors R3, R4; at least one cycle between selections of requests from requestors R5, R6, R7, R8; and at least four cycles between selections of requests from requestors R9, R10.

While judicious selection of a round robin order as given above will partially or totally "hide" pipelining delays in many cases, it may be that, if many cycles are required in a particular design to transmit a request from a lower level arbitration mechanism to a higher level arbitration, or if a large number of requestors are arbitrated by a particular lower level arbitration mechanism, some amount of pipelining delays cannot be hidden. In such a case, the fair hierarchical arbitrator can only provide "approximately" ideal fair round robin arbitration, the approximation accounting for whatever amount of pipeline delay that can not be hidden.

Figure 3B:
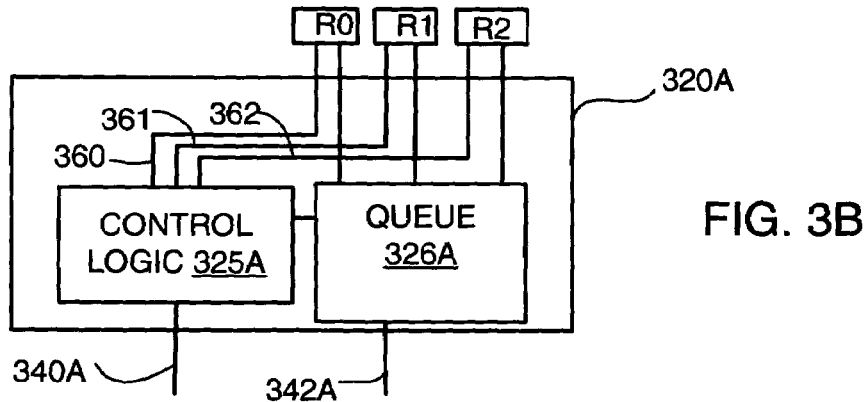
FIG. 3B is a block diagram of an arbitration mechanism used in FIG. 3A.

FIG. 3B shows arbitration mechanism 320A, excerpted from FIG. 3A for convenience. Arbitration mechanism 320A receives requests from requestors R0, R1, and R2. Control logic 325A controls queue 326A in such a manner as to enforce a round robin order for requests from requestors R0, R1, and R2. Control logic 325A is informed of valid requests by requestors R0, R1, and R2, respectively on signals 360, 361, and 362, respectively. For example, if requestor R0 is driving a valid request to queue 326A, requestor R0 drives a "1" on signal 360. If requestor R0 is not driving a valid request to queue 326A, requestor R0 drives a "0" on signal 360. Control logic 325A drives valid request bits on 340A as explained earlier. The winning request is driven on bus 342A. It will be understood that, in embodiments in which a particular requestor, say R0, needs to be given increased weight, that, for example, requestor R0 and R1 are the same requestor (i.e., R0 is also R1). Thus, R0 is given twice as many winning requests as requestor R2 in the round robin ordering.

Figure 3C:
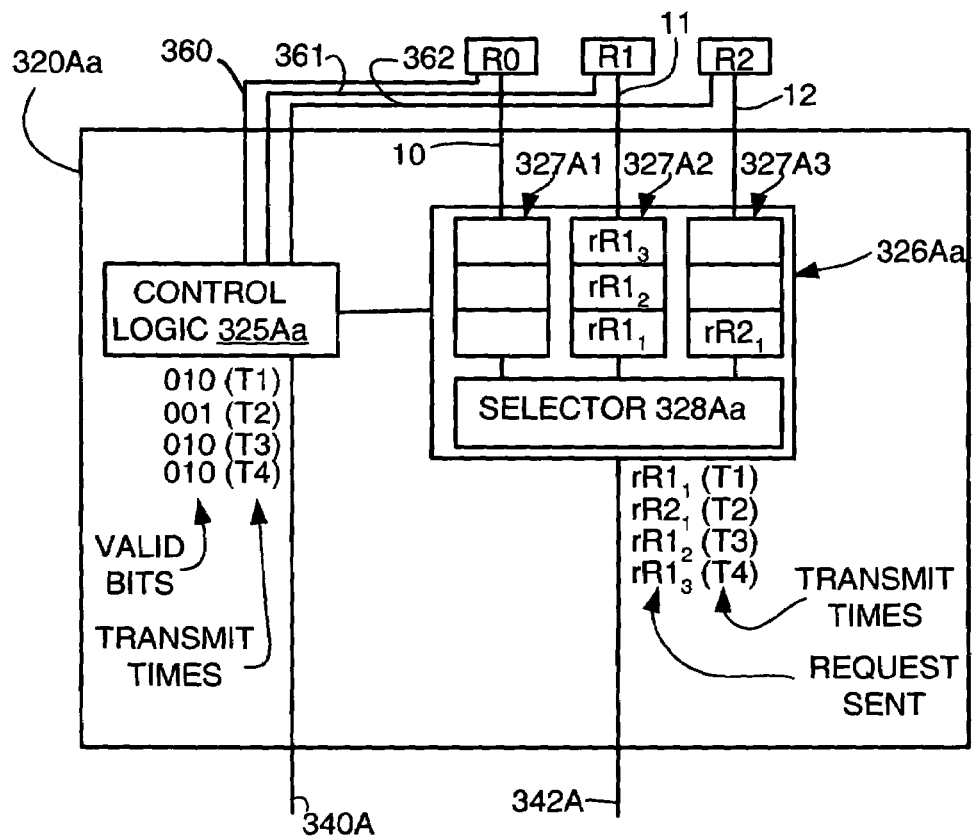
FIG. 3C is a block diagram showing further detail of an embodiment of the arbitration mechanism of FIG. 3B, including exemplary requests and times.

FIG. 3C shows a first embodiment, 320Aa, of arbitration mechanism 320A. In arbitration mechanism 320Aa, queue 326A is implemented as queue 326Aa, having three separate queues, queue 327A1, 327A2, and 327A3. Queue 327A1 queues requests originating from requestor R0; queue 327A2 queues requests originating from requestor R1; and queue 327A3 queues requests originating from requestor R2.

Control logic 325Aa ensures that as requests from requestors R0, R1, and R2 arrive, the requests are stored as far down in each respective queue as possible. Control logic 325Aa uses valid request bits 360, 361, 362 to recognize when requestors R0, R1, and R2 are driving valid requests. For example, if R0 is driving a valid request on bus 10 to queue 327A1, requestor R0 at the same time will drive a "1" on valid request bit 360. It will be understood that when no valid request is being driven by a particular requestor R0, R1, R2 on their respective busses 10, 11, 12, values driven to queue 326Aa are "don't-cares" and are not written into the respective queue 327A1, 327A2, or 327A3.

A small "r" is hereinafter used to indicate a request issued by a particular requestor. Thus, rR0 indicates a request originated by requestor R0. An appended subscript indicates order of requests issued by a particular requestor. Thus $rR0_1$ is a first request originated by requestor R0; $rR0_2$ is a second request originated by requestor R0.

In FIG. 3C, queue 327A1 is shown, for initial condition exemplary purposes, as being empty; queue 327A2 is shown as being full, with three requests from requestor R1 ($rR1_1$, $rR1_2$, and $rR1_3$); and queue 327A3 contains one request, $rR2_1$, from requestor R2. FIG. 3C shows, using the requests shown as an initial condition, and assuming no further requests occur, valid request bits sent on valid request bits 340A and requests sent on bus 342A at times T1, T2, T3, and T4, where times T1, T2, T3, and T4 are successive times. Selection of a winning request is in a round robin order enforced by control logic 325Aa. Control logic 325Aa controls selector 328Aa to select, in turn (assuming a valid request exists in the respective queue), requests from queue 327A1, 327A2, and 327A3, then repeating the selection order. At time T1, $rR1_1$ (first request originating from requestor R1) is driven onto bus 342A. At time T1, "010" is sent on valid request bits 340A, indicating that there is a valid request being sent on bus 342A, and that request originated at requestor R1. At time T2, $rR2_1$ (first request originating from requestor R2) is driven on bus 342A and "001" is driven on valid request bits 340A. At times T3 and T4, respectively, $rR1_2$ and $rR1_3$ are driven on bus 342A. "010" is driven on valid request bits 340A at times T3 and T4. If a request rR0 from requestor R0 had been made at T1, control logic 325Aa would have placed that request at the bottom of queue 327A1, and it would have been driven on bus 342A at time T3, together with a value of "100" on valid request bits 340A at time T3.

Figure 3D:
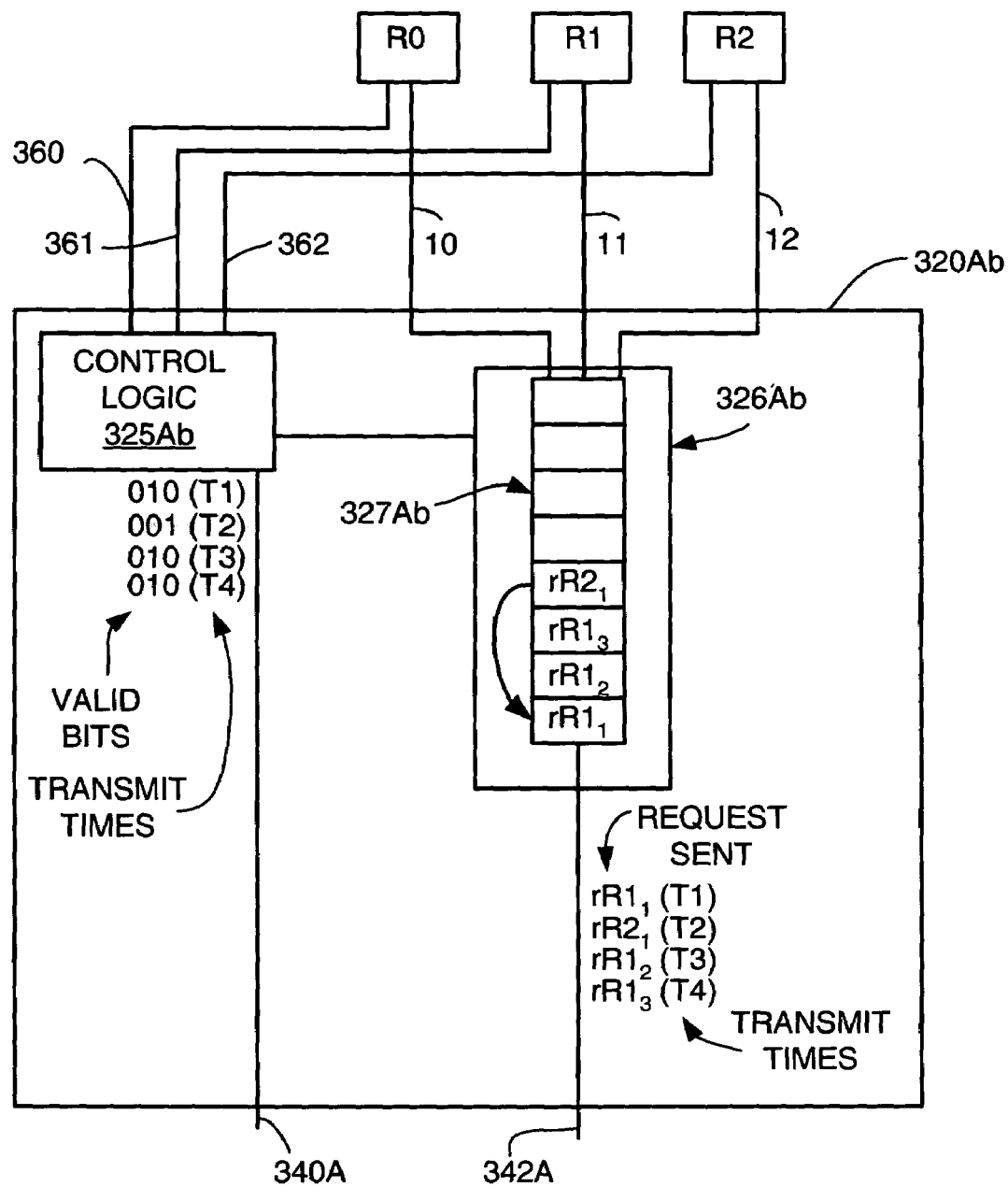
FIG. 3D is a block diagram showing further detail of a second embodiment of the arbiter of FIG. 3B, including exemplary requests and times.

FIG. 3D shows a second embodiment, arbitration mechanism 320Ab, of arbitration mechanism 320A. Queue 326Ab in arbitration mechanism 320Ab has a single, converged, queue 327Ab, into which requests from requestors R0, R1, and R2 are stored. Control logic 325Ab is capable of reordering requests in queue 327Ab to enforce a round robin order. It will be understood that the reordering may, in various embodiments, be a physical reordering by placing requests in different positions in queue 327Ab, or may be a logical reordering or requests, using pointers, for example. In the example of FIG. 3D, three requests rR1 ($rR1_1$, $rR1_2$, and $rR1_3$) are in queue 327Ab, followed by a newly-arrived request rR2 ($rR2_1$) from requestor R2. Control logic 325Ab moves $rR2_1$ to the bottom of queue 327Ab after the first rR1 ($rR1_1$) has been transmitted, as indicated by an arrow. Therefore, using the requests as shown as an initial condition, and assuming no further requests arrive, $rR1_1$ is driven at time T1; $rR2_1$ (moved to the bottom of queue 327Ab by control logic 325Ab) is driven on bus 342A at time T2; a second rR1 (rR1$_2$) is driven at time T3; and a third rR1 (rR1$_3$) is driven at time T4. Also shown are valid request bits driven on valid request bits 340A: "010" at T1; "001" at T2; "010" at T3; and "010" at T4. It will be noted that the two embodiments, 320Aa and 320Ab, of arbitration mechanism 320A, produce identical results on both valid signal bits 340A and bus 342A.

Embodiment arbitration mechanism 320Aa is typically simpler to implement. Embodiment arbitration mechanism 320Ab better accommodates a mix of prolific and infrequent requestors. For example, if requestor R1 is prolific, a relatively large number of registers in a queue are required to handle the large number of requests made by requester R1. If R0 is an infrequent requester, only a few registers in a queue are sufficient to support requests from requester R0, and additional registers in a separate queue for requestor R0 is wasteful. Therefore, a converged queue 327Ab is advantageous for a mix of prolific and infrequent requestors versus queue 327Aa, having separate queues such as queues 327A1, 327A2, and 327A3.

Figure 3E:
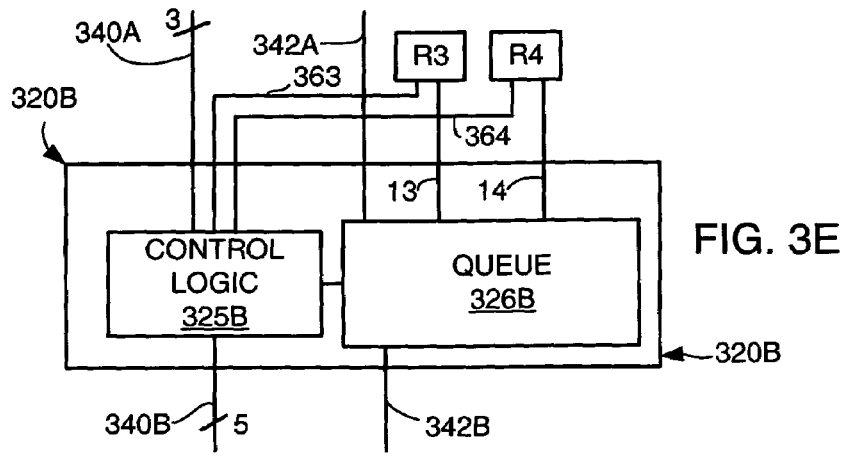
FIG. 3E is a block diagram of a higher level arbitration mechanism of FIG. 3A.

FIG. 3E shows arbitration mechanism 320B, excerpted for convenience from FIG. 3A. Signals 363 and 364 are "1" if requestors R3 and R4, respectively are driving a valid request to queue 326B on their respective busses 13 and 14, and "0" if requesters R3 and R4, respectively, are not driving a valid request to queue 326B.

Figure 3F:
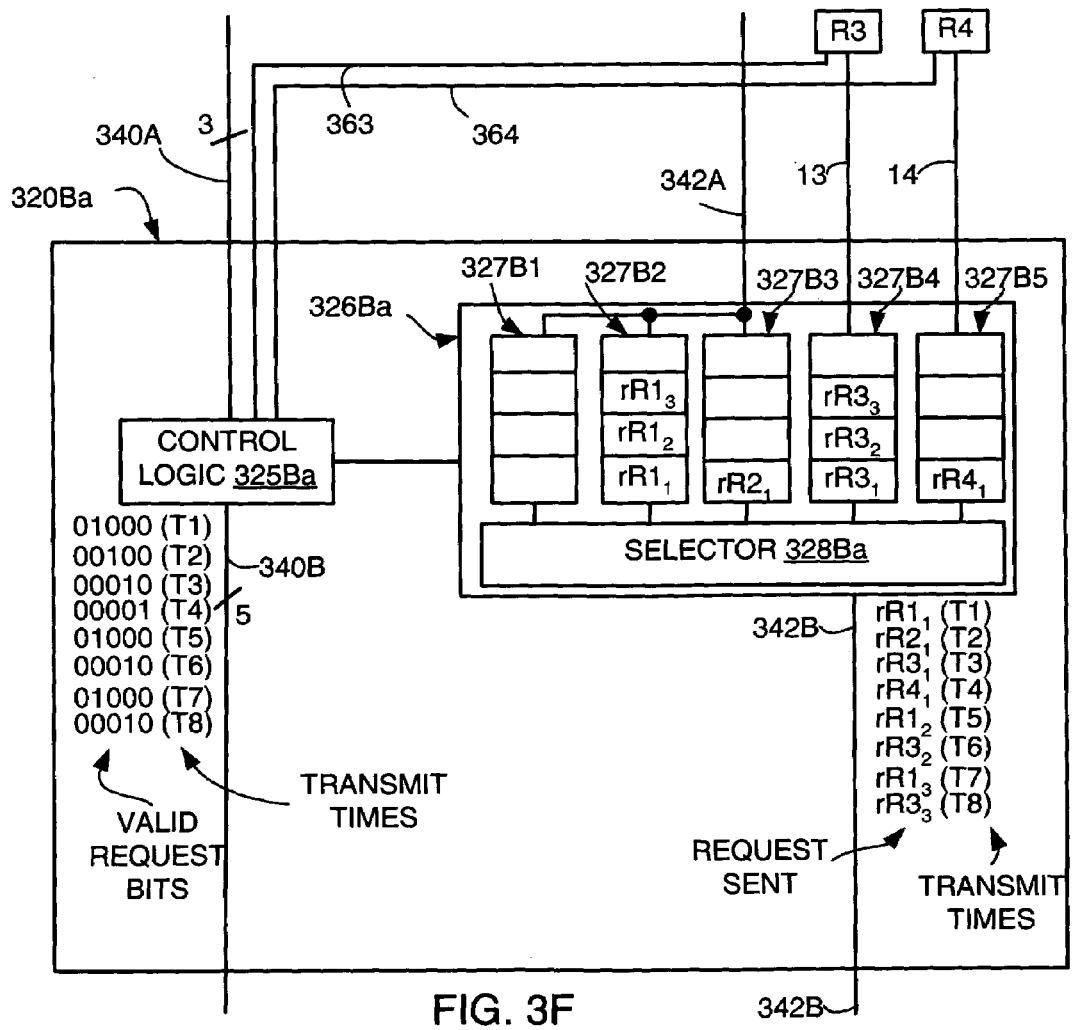
FIG. 3F is a block diagram showing further detail of an embodiment of the arbitration mechanism of FIG. 3E, showing operation of the arbitration mechanism with exemplary requests and times.

FIG. 3F shows an embodiment of arbitration mechanism 320B that is similar to embodiment of arbitration mechanism 320Aa as shown in FIG. 3C; that is, having a separate queue for each separate requestor that arbiter 320B is supporting. It will be understood that an embodiment of arbitration mechanism 320B having a converged queue as described with reference to FIG. 3D is also contemplated. Control logic 325Ba receives valid signal bits 340A and uses values sent on valid signal bits 340A to distribute requests sent on bus 342A to queue 326Ba. Requests sent on bus 342A are sent to queue 327B1 (requests originating from requestor R0) if valid signal bits 340A is "100"; to queue 327B2 (requests originating from requester R1) if valid signal bits 340A is "010"; or to queue 327B3 (requests originating from requester R2) if valid signal bits 340A is "001". Requests from requester R3 are put into queue 327B4 when valid requests are driven by requestor R3 as indicated by a "1" on valid request bit signal 363. Requests from requestor R4 are put into queue 327B5 when valid requests are driven by requestor R4 as indicated by a "1" on valid request bit signal 364. Control logic 325Ba ensures that each request is placed as far down in each respective queue as possible. Control logic 325Ba then selects from the bottom of each queue (327B1-327B5) in round robin order using selector 328Ba to drive requests onto bus 342B.

FIG. 3F also shows an exemplary initial condition set of requests in queues 327B1-327B5. No rR0 requests are in queue 327B1. Three rR1 (rR1$_1$, rR1$_2$, and rR1$_3$) requests are in queue 327B2. One rR2 (rR2$_1$) request is in queue 327B3. Three rR3 (rR3$_1$, rR3$_2$, and rR3$_3$) requests are in queue 327B4. One rR4 (rR4$_1$) request is in queue 327B5. Assuming that no further requests arrive, requests sent, along with valid request bits sent, at times T1-T8 are shown in FIG. 3F. Note that winning requests are sent in round robin order by original requestor and that valid signal bits 340B identify which requestor originated the winning request driven on bus 342B.

Figure 3G:
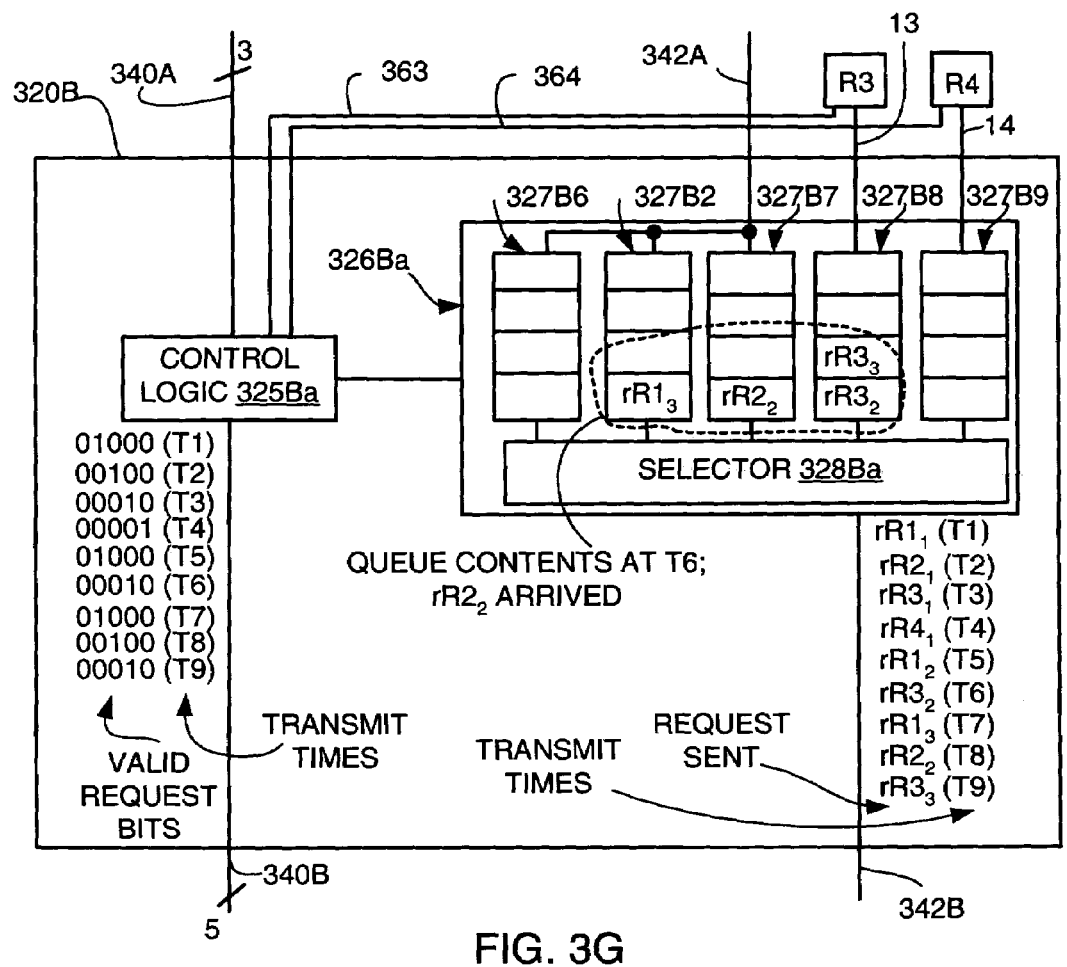
FIG. 3G is a block diagram showing further detail of the arbitration mechanism of FIG. 3F, including an example where a new request is made.

FIG. 3G continues the example of FIG. 3F, only with a new request from requestor R2 (rR2$_2$) that arrives at time T6. The request is identifiable as originating from requestor R2 by the value of valid request bits 340A being "001". Contents of queue 326Ba (queues 327B1-327B5) are shown at T6. As in the example of FIG. 3F, during T6, rR3$_2$ is driven as the winning output of arbiter 324B on bus 342B. Control logic 325Ba, enforcing a round robin order by requestor, selects rR1$_3$ as the winning request at time T7. rR2$_2$ is the winning request at time T8, and rR3$_3$ is the winning request at time T9. Valid request bits transmitted on valid request bits 340B are shown at each transmit time. It will be noticed that rR2$_2$ has effectively bypassed rR3$_3$ which had been received by arbiter 324B before arrival of rR2$_2$.

In a similar manner, arbitration mechanism 320D provides arbitration in round robin order of R0-R10, using valid request bits 340B and valid request bits 340C to determine how many separate requestors are "behind" busses 342B and 342C and which requestor originated the current requests on busses 342B and 342C. Arbitration mechanism 320D may be embodied using eleven separate queues, similar to arbitration mechanism 320Aa shown in FIG. 3C. Arbitration mechanism 320D may alternatively be embodied using a converged queue, similar to that used in arbitration mechanism 320Ab shown in FIG. 3D.

Figure 3H:
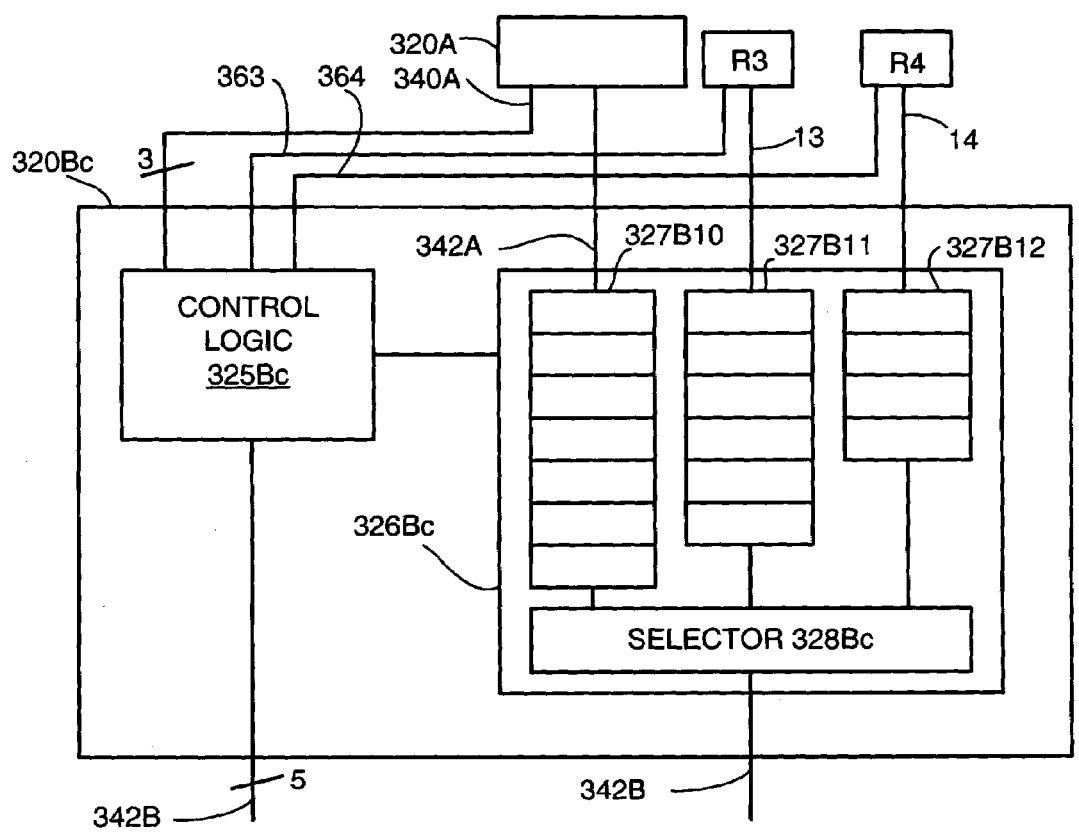
FIG. 3H is a block diagram showing an alternative embodiment of the arbitration mechanism of FIG. 3F.

Queues 326 are not limited to having only a converged queue or separate queues. FIG. 3H illustrates an embodiment, arbitration mechanism 320Bc, of arbitration mechanism 320, having a queue 326Bc that comprises a separate queue for each data stream of requests input to arbitration mechanism 320Bc. Queue 327B10 is a converged queue that receives all requests sent from arbitration mechanism 320A on bus 342A. Queue 327B11 receives all requests sent from directly connected requester R3. Queue 327B12 receives all requests from directly connected requester R4. Note that the queues 327B10, 327B11, and 327B12 are not limited to the same number of registers. Control logic 326Bc manages placement (logical or physical) of requests in each queue. In an embodiment, control logic 325Bc provides for bypassing a request from an infrequent requestor arbitrated by arbitration mechanism 320A past one or more requests from a frequent requester arbitrated by arbitration mechanism 320A in queue 327B10. Control logic 325Bc controls selector 328Bc to select requests from queues 327B10, 327B11, and 327B12 according to the round robin order or the original requesters.

Figure 3I:
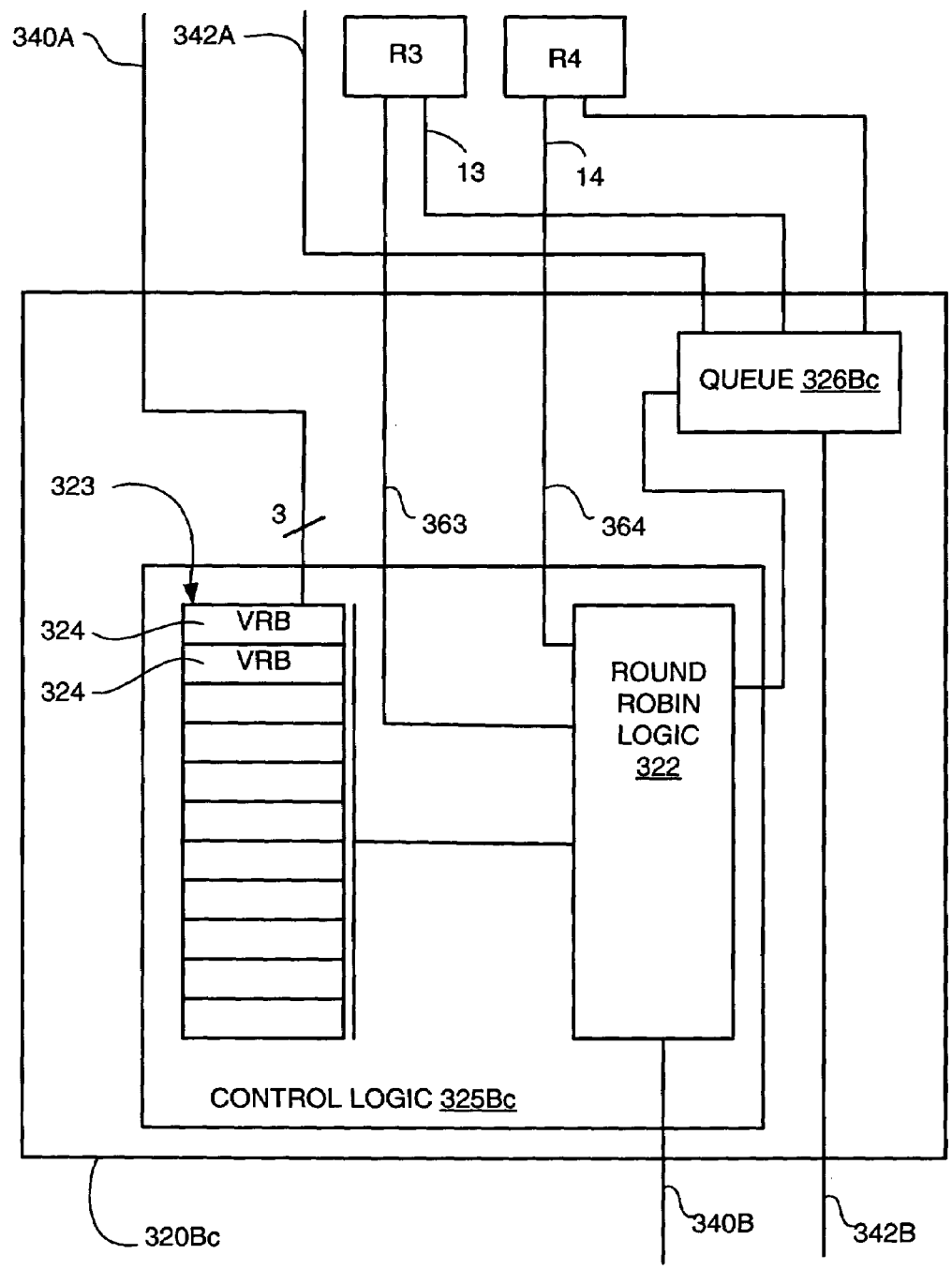
FIG. 3I is a block diagram showing further detail of control logic in the arbitration mechanism of FIG. 3F.

FIG. 3I illustrates further details of control logic 325Bc of arbitration mechanism 320Bc of FIG. 3H. An embodiment of a queue 326B having a converged queue requires that the corresponding control logic 325B retain the values sent on the valid request bits 340 for each request in the converged queue. Queue 327B10 in FIG. 3H is a converged queue that receives requests from requesters R0, R1, and R2. Accompanying each request sent on bus 342A is a corresponding valid request bits value on valid request bits 340A. VRB queue 323 contains the valid request bits (VRB 324, two shown) for requests in corresponding queue positions in queue 327B10 of queue 326Bc. Valid request bit signals 363 from requestor R3 and valid request bit signals 364 are coupled to round robin logic 322. VRB queue 323 is also coupled to round robin logic 322. Round robin logic 322 therefore knows what requests are pending in converged queue 327B10 and separate queues 327B11 and 327B12, and can control selector 328Bc (shown in FIG. 3H) in queue 326Bc to select a request according to the round robin order or the original requester.

Figure 3J:
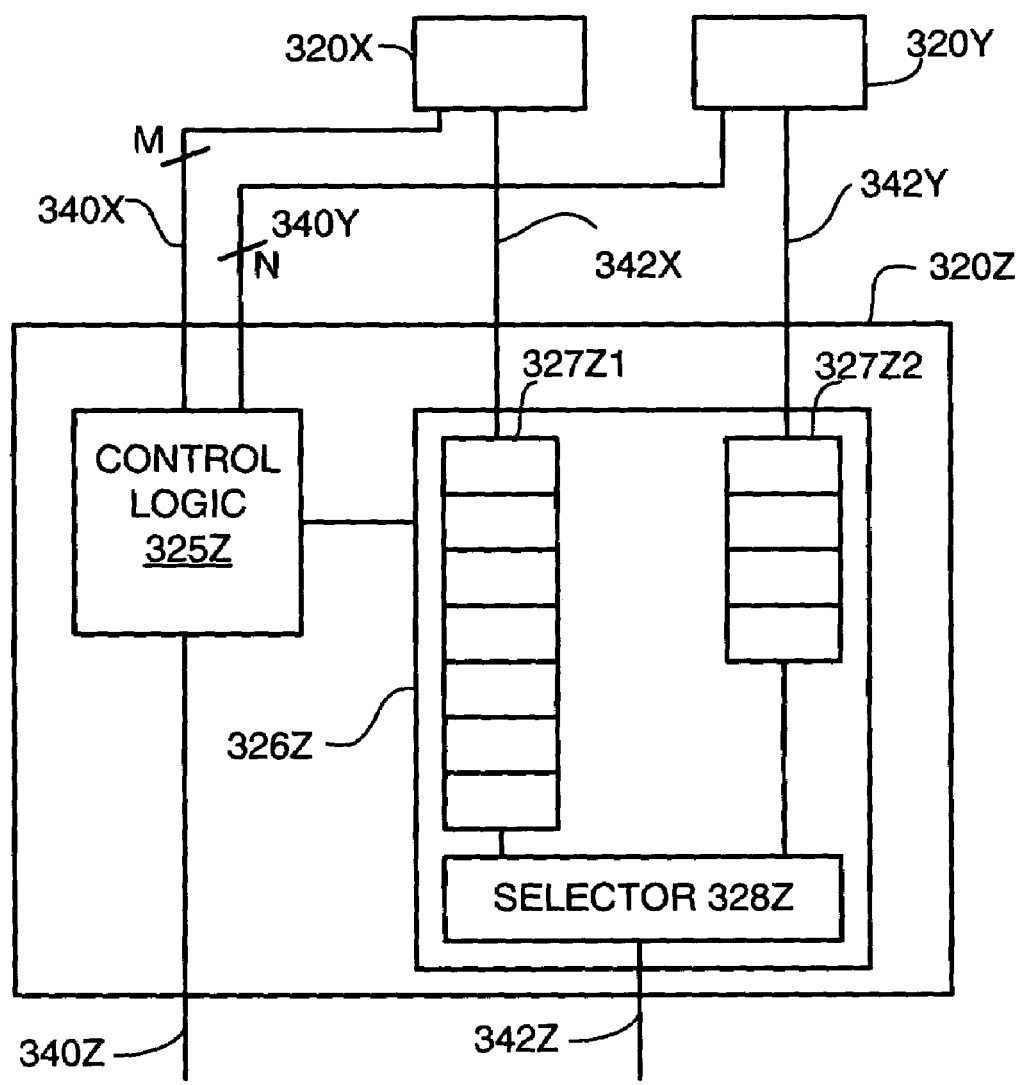
FIG. 3J is a block diagram showing an arbitration mechanism having no requestors directly connected but receiving inputs from two lower level arbitration mechanisms.

FIG. 3J illustrates an arbitration mechanism 320Z that arbitrates requests from lower level arbitration mechanisms 320X and 320Y. Arbitration mechanism 320Z does not have any directly connected requesters. Requests from arbitration mechanisms 320X, 320Y are sent to arbitration mechanism 320Z on busses 342X, 342Y, respectively. Valid request bits sent from 320X, 320Y are sent to control logic 325Z on valid request bits 340X (M bits), 340Y (N bits), respectively. Arbitration mechanism 320Z further comprises a queue 326Z, which further comprises converged queues 327Z1 and 327Z2, and selector 328Z. If arbitration mechanism 320Z is not the highest level arbitration mechanism, valid request bits are sent on valid request bits 340Z (M+N bits). Winning requests are driven on bus 342Z. It will be understood that queue 326Z, in embodiments, can be implemented with separate queues for each original requestor, or a combination of converged queues and separate queues as described earlier.

In an embodiment, a new request entering a particular arbitration mechanism 320 is immediately passed as the winning request on bus 342 of that particular arbitration mechanism 320 if no outstanding requests are in queue 326 of that particular arbitration mechanism 320. In this embodiment no additional request latency is incurred. That is, a request from requestor R0 in arbitration mechanism 320A of FIG. 3A could propagate directly from R0 to bus 342D as the winning request of hierarchical arbiter 300, assuming there are no other requests pending along the route (i.e., in arbiter 324A, arbiter 324B, arbiter 324C, or arbiter 324D). Such a long path, both in terms of physical length and in number of logic blocks that are required (e.g., control logic 325A, control logic 325B, control logic 325C, and control logic 325D) in some implementations might result in a delay longer than a cycle time used in an electronic apparatus (not shown) containing fair hierarchical arbiter 300.

Typically, embodiments of fair hierarchical arbiter 300 use pipelining. For example, in an embodiment, one or more first cycles are used to produce a winning request from arbitration mechanism 320A. One or more second cycles are required to make the winning request from arbitration mechanism 320A the winning request from arbitration mechanism 320B, even if no other requests are pending in arbiter 324B when the winning request of arbitration mechanism 320A is input to arbitration mechanism 320B. One or more third cycles are required to make the winning request from arbitration mechanism 320B the winning request of arbitration mechanism 320D, even if arbiter 324D has no other requests pending. Advantageously, as described by example earlier, a judiciously chosen round robin order that does not consecutively pick requesters from the same lower level arbitration mechanism is used, otherwise, the approximation to a perfect round robin ordering degrades.

As described earlier, prior art hierarchical arbiters offer progressively fewer winning requests to requestors in lower level arbitration mechanisms. For example, it was shown in the background section, in reference to prior art hierarchical arbiter 200, that, "each of requesters L0, L1, L2 would get a winning request only 1/36 of the time." The fair hierarchical arbiter 300 provides each requestor the same number of winning requests, or approximately the same number of winning requests, no matter how many levels of arbitration mechanisms are used, to the degree that pipelining delays can be hidden, as explained above.

Figure 3K:
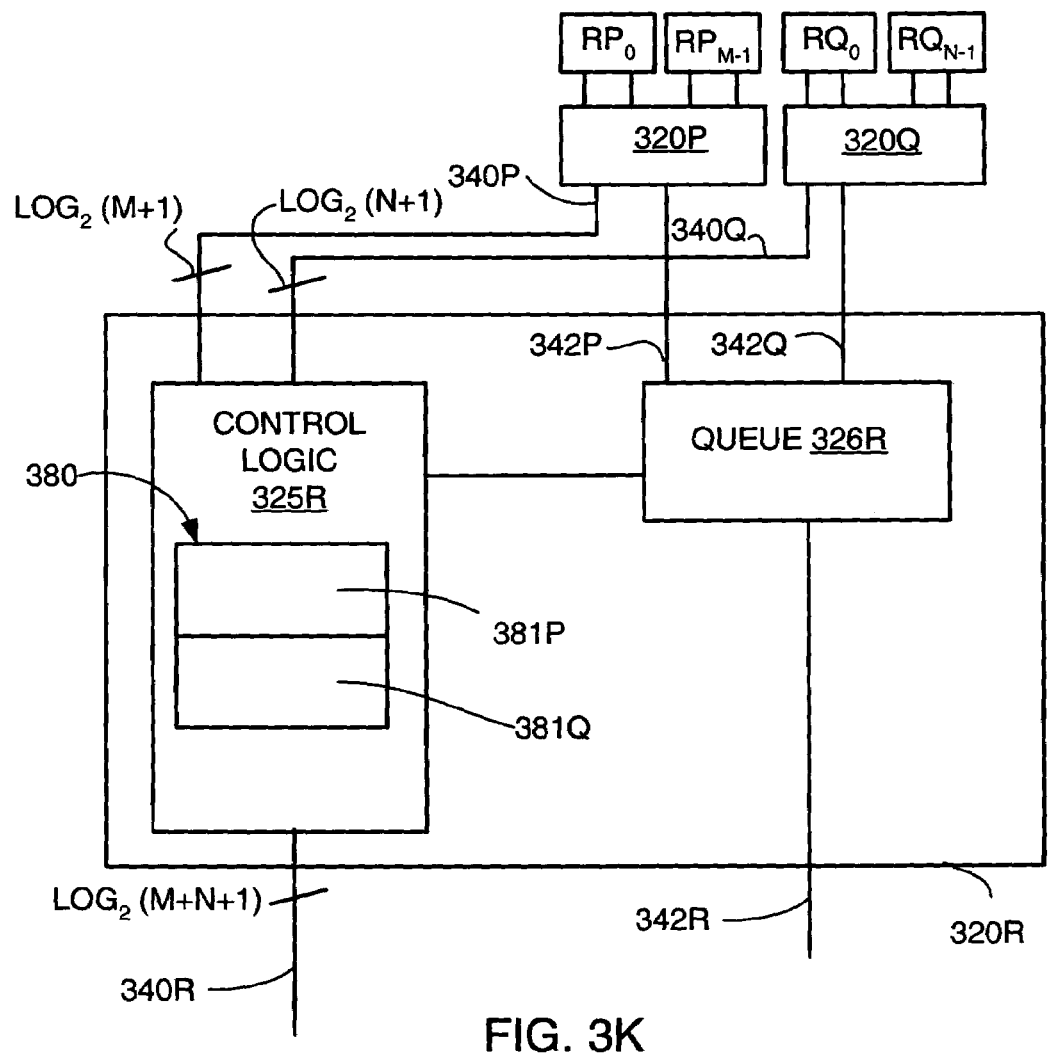
FIG. 3K is a block diagram showing an arbitration mechanism that "knows" how many separate requesters are associated with each request stream received by the arbitration mechanism, and receives an encoded requestor identification associated with each request stream received by the arbitration mechanism.

Embodiments of the present invention include knowledge designed into control logic, or, alternatively, being supplied at bring up of the electronic system containing the control logic, of how many separate requestors share a particular bus 342, that is, come from an lower level arbitration mechanism. Such embodiments are particularly advantageous when a large number of requesters are implemented, which would make the number of valid request bits 340 very large if fully decoded as described in previous embodiments of the invention. For example, if a total of 64 separate requesters are implemented, a total of 64 valid request bits 340 would be required in previous examples. However, encoding of which requestor (if any) originated a request on a bus 342 dramatically reduces the number of valid request bits 340 in embodiments of the invention. FIG. 3K illustrates such an embodiment. Arbitration mechanism 320P receives requests from requestors $RP_0$ to $RP_{M-1}$. Arbitration mechanism 320Q receives requests from $RQ_0$ to $RQ_{N-1}$. Arbitration mechanism 320P forwards requests on bus 342P to queue 326R of arbitration mechanism 320R. Arbitration mechanism 320Q forwards requests on bus 342Q to queue 326R. Arbitration mechanism 320P sends encoded information as to which (if any) requestor $RP_0$ to $RP_{M-1}$ originated the current winning request sent on bus 342P on valid request bits 340P. Since arbitration mechanism 320P arbitrates a total of "M" requestors, valid request bits 340P must have $LOG_2$ (M+1) bits. For example, if arbitration mechanism 320P arbitrates among 63 requesters (that is, M=63), valid request bits 340P will have to have six bits. "M+1", rather than "M" accounts for the possibility than none of the "M" requesters has a currently valid request. Similarly, arbitration mechanism 320Q arbitrates requests from "N" requestors. Valid request bits 340Q requires LOG2 (N+1) bits to identify which (if any) requestor $RQ_0$ to $RQ_{N-1}$ originated the current winning request sent on bus 342Q. Control logic 325R is designed to know how many requestors are arbitrated by arbitration mechanisms 320P and 320Q. Table 380 in control logic 325R contains a field 381P for the value of "M", and a field 381Q for the value of "N". Fields 381P and 381Q may be "hard coded" in the design of control logic 325R, or maybe scanned in during bring up of the electronic system that includes arbitration mechanism 320R. Fields 381P and 381Q may alternatively be fuse programmable. It will be understood that there are a large number of ways that information about number of requesters that are arbitrated by lower level arbitration mechanisms inputting requests to an arbitration mechanism can be accommodated. Control logic 325R drives valid bits 340R indicating which requestor, if any, originated the winning request currently driven on bus 342R. Valid request bits 340R must account for the "M+N" total requesters, as well as the possibility that there is not a currently valid request driven on bus 342R.

FIG. 4 is a flow chart of a method embodiment used by a fair hierarchical arbiter having more than one level of arbitration mechanisms. As explained earlier, the highest level arbitration mechanism outputs a winning request from the fair hierarchical arbiter to a request handler. A lower level arbitration mechanism outputs a winning request from that lower level arbitration mechanism to a higher level arbitration mechanism, which may be the highest level arbitration mechanism.

Step 502 begins the method.

In step 504, a particular arbitration mechanism receives a new request from a requestor in a plurality of requesters. The new request may be from a lower level arbitration mechanism, or the new request may be directly from a requestor connected directly to the same arbitration mechanism.

In step 506, if valid request bits are input to the particular arbitration mechanism from a particular lower level arbitration mechanism, the valid request bits are received, and the particular arbitration mechanism determines from the valid request bits how many separate requestors are arbitrated by the particular lower level arbitration mechanism, as well as which requestor arbitrated by the particular lower level arbitration mechanism originated the new request.

In step 508, the new request is placed in a queue in the particular arbitration mechanism, the placement in the queue determined by what requestor originated the request. It will be understood that "placement" includes either physical placement (that is, which register a request is physically placed into) or logical placement, such as implementation of pointers being set that determine logical order of requests in a converged queue).

In step 510, the particular arbitration mechanism outputs a winning request from the queue according to a round robin ordering of all requesters arbitrated by the particular arbitration mechanism. For example, if there are N requesters, all having one or more valid requests pending at the particular arbitration mechanism, the particular arbitration mechanism will output, in order, requests from requestors 1, 2, 3, . . . N, and then repeat starting with a next request from requestor 1. If a certain requestor does not have a pending request at its turn in the round robin order, the arbitration mechanism selects the next requestor in the round robin order that does have a pending request. As explained earlier, the round robin order implemented in a given arbitration mechanism can be any sequence through a set of requesters arbitrated by the given arbitration mechanism. In particular, in a pipelined fair hierarchical arbiter, consecutive selects from requestors in a particular lower level arbitration mechanism may cause those requestors to not get as many winning requests output from the fair hierarchical arbiter in a given amount of time due to pipeline delays. Advantageously the round robin order is chosen to hide as much pipeline delay as possible.

It will be recalled that, if a particular requestor requires more throughput, that particular requestor can be simply assigned more than one requestor position, or "slot", in a given arbitration mechanism. In the example given earlier, an arbitration mechanism gave two arbitration "slots" to requestor R0, and one arbitration "slot" to requestor R2.

In step 512, the particular arbitration mechanism outputs valid request bits which indicate how many separate requesters the particular arbitration mechanism is arbitrating, and which requestor originated the winning request that is output by the particular arbitration mechanism. For example, if the particular arbitration mechanism is arbitrating among twelve separate requestors, the particular arbitration mechanism would output twelve bits, each bit position corresponding to one of the twelve requesters. All bits will be "0" except for the bit in the bit position corresponding to the requestor that originated the current winning request that is output from the particular arbitration mechanism. If there is no current valid winning request that is output from the particular arbitration mechanism, all twelve bits will be "0". The method repeats, receiving new requests as they are made by the requestors.

In this manner the overall winning request of the hierarchical arbiter, when processed by instantiations of the arbitration mechanism described, is chosen fairly. Therefore, the probability of each requestor of being chosen at a particular time does not depend on prolific requestors or level or arbitration mechanism; it only depends on where the requestor lies in the specified round robin order of arbitration.

What is claimed is:

1. A fair hierarchical arbiter comprising:
   a first arbitration mechanism coupled to at least one first requestor that produces requests, the first arbitration mechanism outputting first winning requests on a first winning request output, and first valid request bits on a first valid request bits output, the first valid request bits conveying information as to which particular requestor in the at least one first requestor originated a current request driven on the first winning request output; and
   a second arbitration mechanism coupled to the first winning request output, and to the first valid request bits, the second arbitration mechanism further coupled to at least one second requestor, the second arbitration mechanism outputting second winning requests on a second winning request output;
   wherein the first valid request bits are used by the second arbitration mechanism to ensure requests driven on the second winning request output are requests originated by the at least one first requestor and the at least one second requestor in a round robin order of all requestors in a total set of requestors consisting of the at least one first requestor and the at least one second requestor.

2. The fair hierarchical arbiter of claim 1, the first valid request bits comprising a bit corresponding to each requestor in the at least one first requestor arbitrated by the first arbitration mechanism;
   wherein a value of a particular bit in the first valid request bits is a first binary value if a current first winning request driven on the first winning request output originated at a requestor corresponding to the particular bit in the first valid request bits, and where all other bits in the first valid request bits are a second binary value, the second binary value being different from the first binary value.

3. The fair hierarchical arbiter of claim 2, wherein all bits in the first valid request bits have the second binary value if no current first winning request is driven on the first winning request output.

4. The fair hierarchical arbiter of claim 1, wherein the at least one second requestor is a nonprimitive requestor.

5. The fair hierarchical arbiter of claim 1, wherein the first valid request bits are an encoded identification of which requestor in the at least one first requestor originated the current request driven on the first winning request output.

6. The fair hierarchical arbiter of claim 5, wherein the second arbitration mechanism knows how many requestors are being arbitrated by the first arbitration mechanism by having the number of requestors being arbitrated by the first arbitration mechanism "hard coded" into the design of the second arbitration mechanism, or by having the number of requestors being arbitrated by the first arbitration mechanism stored in a field that is readable by the second arbitration mechanism.

7. The fair hierarchical arbiter of claim 1, the first arbitration mechanism further comprising:
   a first queue capable of holding a plurality of requests; and
   a first control logic capable of selecting requests from the first queue so that winning requests are chosen in round robin order of requestors arbitrated by the first arbitration mechanism;
   the second arbitration mechanism further comprising:
   a second queue capable of holding a plurality of requests; and
   a second control logic capable of selecting requests in the second queue so that winning requests are chosen in round robin order of requestors arbitrated by the second arbitration mechanism.

8. The fair hierarchical arbiter of claim 7, the first queue further comprising a separate queue for one or more requestors arbitrated by the first arbitration mechanism.

9. The fair hierarchical arbiter of claim 7, the second queue further comprising a separate queue for one or more requestors arbitrated by the second arbitration mechanism.

10. The fair hierarchical arbiter of claim 7, the first queue further comprising a converged queue into which requests from one or more requestors arbitrated by the first arbitration mechanism are stored.

11. The fair hierarchical arbiter of claim 7, the second queue further comprising a converged queue into which requests from one or more requestor arbitrated by the second arbitration mechanism are stored.

12. The fair hierarchical arbiter of claim 1, wherein a particular request from one of the at least one first requestors is driven as a particular second winning request on the second winning request output within a cycle time of an electronic apparatus containing the fair hierarchical arbiter.

13. The fair hierarchical arbiter of claim 1, wherein a particular request from one of the at least one first requestors takes one or more first clock cycles to be driven as a particular first winning request on the first winning request output; and wherein the particular request from one of the at least first requestors, when driven as the particular first winning request on the first winning request output further takes one or more second clock cycles to be driven as a particular second winning request on the second winning request output.

14. The fair hierarchical arbiter of claim 13, wherein a round robin order of all requestors hides some or all of the one or more first clock cycles and/or one or more of the second clock cycles.

15. A method for a fair hierarchical arbiter, the fair hierarchical arbiter having more than one level of arbitration mechanisms, comprising the steps of:
  receiving input requests from requestors in a total set of requestors in the more than one level of arbitration mechanisms;
  when a particular arbitration mechanism of the more than one level of arbitration mechanisms, receives requests from a lower level arbitration mechanism, performing the steps of:
    determining a number of lower level requestors that the lower level arbitration mechanism arbitrates;
    including the lower level requestors in a set of all requestors arbitrated by the particular arbitration mechanism; and
    selecting as winning requests output by the particular arbitration mechanism requests from the set of all requestors arbitrated by the particular arbitration mechanism in a round robin order by requestor in the set of all requestors arbitrated by the particular arbitration mechanism and
  outputting winning requests in a round robin order by requestor in the total set of requestors.

16. The method of claim 15, the step of selecting, as winning requests output by the particular arbitration mechanism further including the step of bypassing a first request by a second request, the second request received after the first request in order to enforce the round robin order by requestor of all requestors arbitrated by the particular arbitration mechanism.

17. The method of claim 15, further including the step of defining the round robin order to hide at least a portion of a pipelining delay.

18. A method for a fair hierarchical arbiter, the fair hierarchical arbiter having more than one level of arbitration mechanisms, comprising the steps of:
  receiving input requests from requestors in a total set of requestors in the more than one level of arbitration mechanisms;
  if a particular arbitration mechanism is not a highest level arbitration mechanism in the fair hierarchical arbiter, of sending information about requestors that the arbitration mechanism arbitrates to a higher level arbitration mechanism
  if the particular arbitration mechanism is not the highest level arbitration mechanism in the fair hierarchical arbiter, of sending information about which requestor arbitrated by the particular arbitration mechanism originated a current winning request output by the particular arbitration mechanism; and
  outputting winning requests in a round robin order by requestor in the total set of requestors.

19. The method of claim 18, wherein the information about which requestor arbitrated by the particular arbitration mechanism originated a current winning request output by the particular arbitration mechanism includes an encoded identification of the requestor.

20. The method of claim 18, wherein the information about requestors that the arbitration mechanism arbitrates to a higher level arbitration mechanism includes a number of requestors that the arbitration mechanism arbitrates.

* * * * *